(12) United States Patent
Su et al.

(10) Patent No.: US 6,850,705 B2
(45) Date of Patent: Feb. 1, 2005

(54) ONLINE DISTRIBUTED PATH ROUTING METHOD AND SYSTEM

(75) Inventors: Ching-Fong Su, Milpitas, CA (US); Takafumi Chujo, Cupertino, CA (US)

(73) Assignee: Fujitsu Limited, Kanagawa (JP)

( * ) Notice: Subject to any disclaimer, the term of this patent is extended or adjusted under 35 U.S.C. 154(b) by 713 days.

(21) Appl. No.: 09/810,892

(22) Filed: Mar. 17, 2001

(65) Prior Publication Data

US 2002/0163682 A1 Nov. 7, 2002

(51) Int. Cl.[7] .............................................. H04B 14/00
(52) U.S. Cl. .............................................. 398/5; 398/7
(58) Field of Search .............................. 398/1–2, 5, 7; 370/216, 228

(56) References Cited

U.S. PATENT DOCUMENTS

| | | |
|---|---|---|
| 4,710,924 A | 12/1987 | Chum |
| 4,956,835 A | 9/1990 | Grover |
| 5,289,462 A | 2/1994 | Ahmadi et al. |
| 5,341,364 A | 8/1994 | Marra et al. |
| 5,495,471 A | 2/1996 | Chow et al. |
| 5,548,639 A | 8/1996 | Ogura et al. |
| 5,550,805 A | 8/1996 | Takatori et al. |
| 5,590,119 A | 12/1996 | Moran et al. |
| 5,731,887 A | 3/1998 | Fee |
| 5,793,745 A | 8/1998 | Manchester |
| 5,850,505 A | 12/1998 | Grover et al. |
| 5,930,017 A | 7/1999 | Davis et al. |
| 5,958,063 A | 9/1999 | Croslin et al. |
| 5,986,783 A | 11/1999 | Sharma et al. |
| 5,999,288 A | 12/1999 | Ellinas et al. |
| 6,021,113 A | 2/2000 | Doshi et al. |
| 6,023,452 A | 2/2000 | Shiragaki |
| 6,046,833 A | 4/2000 | Sharma et al. |
| 6,047,331 A | 4/2000 | Medard et al. |
| 6,073,248 A | 6/2000 | Doshi et al. |
| 6,075,631 A | 6/2000 | Bala et al. |
| 6,111,672 A | 8/2000 | Davis et al. |
| 6,130,875 A | 10/2000 | Doshi et al. |
| 6,130,876 A | 10/2000 | Chaudhuri |
| 6,151,304 A | 11/2000 | Doshi et al. |
| 6,160,651 A | 12/2000 | Chang et al. |
| 2002/0097671 A1 * | 7/2002 | Doverspike et al. ........ 370/216 |

OTHER PUBLICATIONS

Gisli Hjalmtysson, et al., Restoration Services for the Optical Internet, Photonics East, Nov. 2000, 8 pages.
Albert Greenberg, et al., Smart Routers—Simple Optics—A Network Architecture for IP over WDM, Optical Fiber Commun. Conf., ThU3, Mar. 2000, 14 pages.
Peter Newman, et al., IP Switching and Gigabit Routers, 1996, IEEE Communications Magazine, http://www.ipsilon.com/technology/papers/ieee_comm96.htm, 8 pages.
Xun Su, et al., Source Routing in Networks with Uncertainty: Inference, Sensitivity and Path Caching, In Proc. IEEE Globecom, 2000, 5 pages (pp. 460–464).
Xin Yuan, et al., Distributed Path Reservation Algorithms for Multiplexed All–Optical Interconnection Networks, Third International Symposium on High Performance Computer Architecture (HPCA 3), San Antonio, Texas, Feb. 1–5, 1997, [30/152+20%], 10 pages.

(List continued on next page.)

Primary Examiner—M. R. Sedighian
Assistant Examiner—Shi K. Li
(74) Attorney, Agent, or Firm—Christie, Parker & Hale, LLP

(57) ABSTRACT

A method and apparatus for selecting failure protection paths in a WDM network. The method exploits wavelength reservation sharing potentials presented by non-concurrent failure events on a plurality of links sharing a link in a protection path. Light-weight aggregated link metrics termed "buckets" are used to track wavelength reservations for protection paths on individual links in the network. These buckets are then used to construct protection paths with minimized wavelength consumption. The method is employed on individual networking devices in a distributed manner or is used by a centralized network management system to allocate protection paths.

44 Claims, 8 Drawing Sheets

OTHER PUBLICATIONS

Daniel O. Awduche, et al., A Framework for Internet Traffic Engineering, draft–ietf–tewg–framework–02.txt, Internet Engineering Task Force, Internet–Draft, TE Working Group, Jul. 2000, 64 pages.

The Mechanics of Routing Protocols, Cisco Press, 1997 Macmillan Publishing USA, a Simon & Schuster Company, 18 pages.

N. Chandhok, et al., IP Over Optical Networks: A Summary of Issues, IPO and MPLS, Internet Draft Document: draft–osu–ipo–mpls–issues–00.txt Category: Informational, Jul. 2000, 51 pages.

Srinivasan Seetharaman, IP over DWDM, ftp://ftp.netlab.ohio-state,edu, Nov. 23, 1999, 19 pages.

Bhui [SMTP:bhui@darpa.mil], Thursday, Jun. 19, 1997, 10:37 AM, Terabit per Second Switching, 2 pages.

T. Kurosawa, et al., Wavelength Path Protection System for 2.4G DWDM, NEC Corporation 1994–2001, 2 pages.

Alcatel Architects of an Internet Word, Alcatel USA, Terrestrial Networks, Alcatel Networks Systems Inc., 1996, 5 pages.

Cisco 12000 Gigabit Switch Router Family Layer 3 Protection Switching, 20 pages.

Neil A. Jackman, et al., Optical Cross Connects for Optical Networking, Bell Labs Technical Journal, Jan.–Mar. 1999, Lucent Technologies, Inc.,Jan.–Mar. 1999, 20 pages.

R. Coltun, RFC 2370—The OSPF Opaque LSA Option, www.faqs.org, The OSPF Opaque LSA Option, Network Working Group, Request for Comments: 2370, FORE Systems, July 1998, 10 pages.

G. Apostolopoulos, et al., Quality of Service Based Routing: A Performance Perspective, In Proc., ACM Sigcomm, 1998.

P. Bonenfant et al., Optical Data Networking, IEEE Comm. Magazine, Vol. 38 No. 3:63–70, 2000.

B.T. Doshi, et al., Optical Network Design and Restoration, Bell Labs Technical Journal, pp. 58–84, Jan.–Mar. 1999.

D. Awduche, et al., Multi–Protocol Lambda Switching: Combining MPLS Traffic Engineering Control with Optical Crossconnects (draft–awduche–mpls–te–optical–02.txt, work in progress, Internet Draft, Jul. 2000.

G. Bernstein, et al., Optical Domain Service Interconnect (ODSI) Functional Specification, ODSI Coalition, Mar. 2000, Version 1.1, 22 pages.

T. Chujo, et al., The Design And Simulation Of An Intelligent Transport Network With Distributed Control, Network Operations Management Symposium, 1990.

W.D. Grover, et al., Development and Performance Verification of a Distributed Asynchronous Protocol for Real–Time Network Restoration, IEEE JSAC, 9(1):112–125, 1991.

N. Ghani, et al., On IP–Over–WDM Integration. IEEE Comm. Magazine, vol. 38 No. 3:72–84, 2000.

A. Greenberg, et al., Smart Routers—simple Optics: A Network Architecture for IP Over wdm. Optical Fiber Conference, 2000.

R. R. Iraschko, et al., A Highly Efficient Path–Restoration Protocol for Management of Optical Network Transport Integrity, IEEE JSAC, V. 18. No. 5:779–794, 2000.

R. R. Iraschko, et al., Optimal Capacity Placement for Path Restoration in Mesh Surviviable Networks, IEEE ICC, V. 18 No. 5, 1996.

M. Kodialam, et al., Dynamic Routing Of Restorable Bandwidth Guaranteed Tunnels Using Aggregated Network Resource Usage Information, In Proc., IEEE, Infocom, 2000.

K. Murakami, et al, Optimal Capacity and Flow Assignment for Self–Healing ATM Networks based on Line and End – to–End Restoration, IEEE/ACM Transactions on Networking, 6(2):207–221, 1998.

Bellcore Special Report, Digital Cross–Connect Systems in Transport Network Survivability. SR–NWT–002514, Issue 1, 1993.

H. Sakauchi, et al., A Self–Healing Network with an Economical Spare–Channel Assignment, In Proc. IEEE Globecom, pp. 438–443, 1990.

T.H. Wu, A Passive Protected Self–Healing Mesh Network Architecture and Applications, IEEE/ACM Trans. Networking, 2(1):40–52, 1994.

T.H. Wu, Emerging Technologies for Fiber Network Survivability, IEEE Comm. Magazine, pages 58–74, Feb., 1995.

* cited by examiner

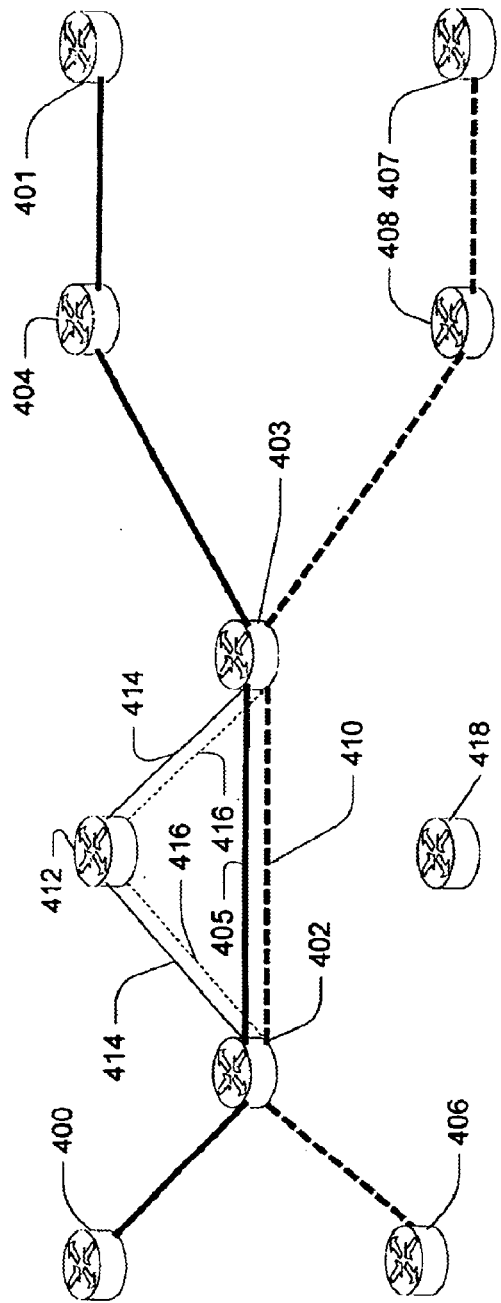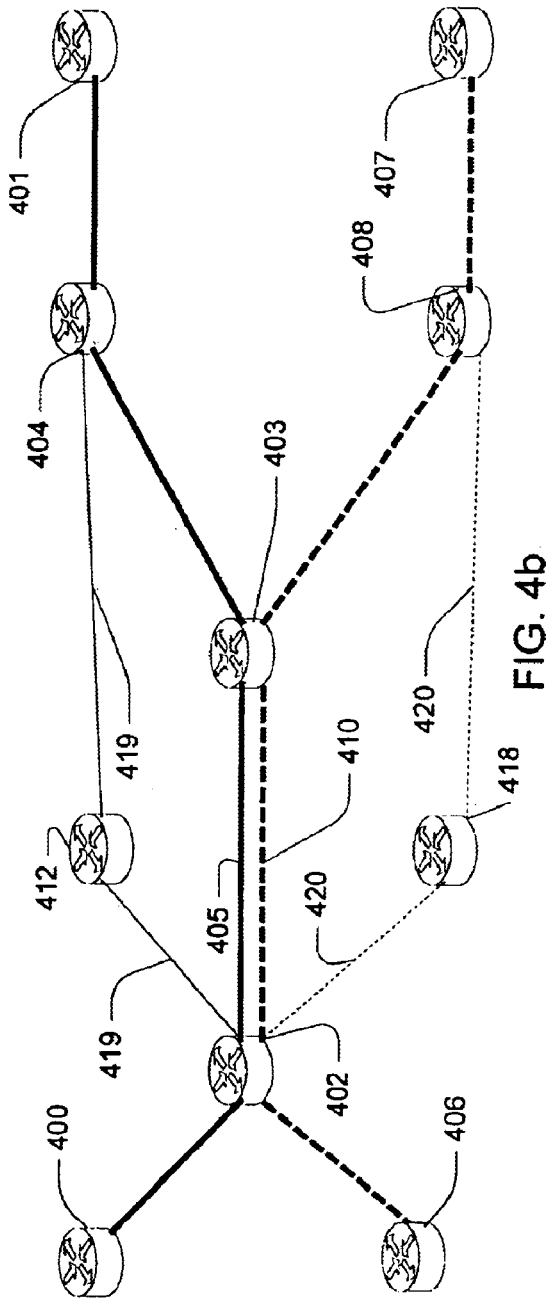
FIG. 4a
FIG. 4b

ONLINE DISTRIBUTED PATH ROUTING METHOD AND SYSTEM

BACKGROUND OF THE INVENTION

This invention relates generally to the field of optical communication systems and specifically to determining a protection path through an Wave Division Multiplexing (WDM) network.

The popularity of the Internet has created a deluge of data traffic. The data traffic may force service providers to consider new infrastructures that meet the explosive demand for bandwidth. Wavelength Division Multiplexing (WDM), which allows a single fiber to carry multiple signals simultaneously, is perceived to be a promising candidate to address the bandwidth shortage on the Internet. While the enormous amount of bandwidth provided by WDM may help alleviate the mounting pressure for higher access speed, it also makes protection/restoration a very important issue in network management. For example, current technology allows up to 128 wavelengths to be multiplexed in a single fiber, each with a data rate up to 10 Gbps. This roughly translates into millions of telephone calls on a single fiber. Hence it is easy to comprehend the catastrophic consequence a fiber cut may cause without an appropriate protection mechanism in place.

Different types of protection schemes have been developed for optical networks. Many existing transport networks use Synchronous Optical NETwork (SONET) rings. SONET rings are simple topologies which contain two separate paths between any pair of nodes which are resilient to any single link or node failures. Although simple and fast, the direct application of the ring architectures in WDM networks brings a number of problems. It is well known that ring-structured protection schemes typically rely on excessive capacity redundancy. By contract, one can provide protection with substantially less spare capacity on mesh optical networks. The protection schemes on mesh optical networks were intensively studied in the early 1990s. Nevertheless, mesh-based SONET is not widely used due to certain inadequacies, notably the slow restoration process that sometimes takes more than 2 seconds.

Typical Digital Cross-Connect Systems (DCSs) in transport networks have very limited functionality. Hence only simple restoration algorithms were previously developed for mesh networks. Recently the emerging use of Optical Cross Connects (OXCs) on WDM networks are shedding new light on the survivability issues of mesh networks. Intelligent OXCs, unlike their predecessor DCSs, function much more like Asynchronous Transfer Mode (ATM) switches or Internet Protocol (IP) routers. OXCs offer dynamic configuration via light path switching and allow many management tasks to be carried out in a distributed manner. Because of the dominance of IP traffic, IP-oriented control plane are being considered for WDM-based optical networks in order to provide seamless data transport. The goal is to provide integrated functions such as light path routing, signaling, and restoration. This brings forth a significant shift in the management paradigm from centralized control to distributed control. This shift in management paradigm has significant impact on the design of protection solutions for WDM networks.

Two major issues of network survivability/restoration, namely time and resource efficiency, now can be addressed separately. Restoration may be handled in two phases, planning and activation. Resource efficiency is optimized during the planning stage with restoration speed being optimized during the activation phase. At the planning phase, protection light paths are pre-computed and stored in OXCs before failures occur. At the activation phase when actual failure occurs, OXCs switch to pre-determined protection light paths. Thus traffic can be re-routed promptly in real time.

Most of the previously proposed solutions to optimize resource utilization in survivable mesh networks assumed that complete information about traffic demands is known a priori. Therefore, the protection paths for these demands were computed in a batch, either in a centralized manner or through distributed algorithms. The batch computation may work well in conventional telecommunication networks where the traffic demand is relatively static, but batch computations are not suitable in a dynamic, data-centric environment such as the bandwidth-on-demand paradigm now considered by Optical Domain Service Interconnect (ODSI) and Internet Engineering Task Force (IETF). With batch computation, any incremental changes of traffic demand may cause every existing path to be re-computed, which is not desirable.

The existing methods to restore path computation can be roughly categorized into either path-based or link-based approaches. In the former case, upon the detection of the failure event by the destination node of the connection, a notification is sent to the traffic source where the backup path is activated. In the latter case a failure event is detected and dealt with locally, i.e., a "detour" is set up around the failed link/node.

On the one hand, a path-based approach benefits from its ability to create a resource-efficient backup path, but it incurs longer response time. On the other hand, link-based approach may not be able to establish the "optimal" protection path, but the speed at which a backup path is set up is much higher.

SUMMARY OF THE INVENTION

According to the present invention, a protection path for a link in a working path through a network comprising a set of nodes and a set of links between the nodes is determined by using a set of link metrics corresponding to wavelength reservations for a set of protected links on a set of protection path links. A set of widths is calculated using the set of link metrics, each width in the set of widths corresponding to a capacity of a protection path link to protect the working path link. The set of widths are used to determine a protection path using protection path links with the greatest widths.

In one aspect of the invention, a data processing system is adapted to determine a protection path for a failure event link in an optical network of a set of nodes interconnected by a set of links. The data processing system receives a set of link metrics corresponding to wavelength reservations for a set of protected links on a set of protection path links. The data processing system calculates a set of widths using the set of link metrics with each width corresponding to a capacity of a protection path link to protect the failure event link. The data processing system then calculates a protection path including protection path links for the failure event link using the set of widths.

In another aspect of the invention, widths are calculated as normalized differences between a maximum wavelength reservation on a protection path link and a wavelength reservation on the protection path link for a failure event link. A set of possible protection pathways are calculated and a maximum width is determined for the set of possible protection pathways. The width of a protection path is determined as the minimum width of any of the protection path links included in the protection path. If the maximum width is greater than zero, then a protection pathway is chosen at random from the set of possible protection pathways. If the maximum width is equal to zero, then a protection path is selected by determining which protection path has the least number of protection path links with a width of zero.

BRIEF DESCRIPTION OF THE DRAWINGS

These and other features, aspects, and advantages of the present invention will become better understood with regard to the following description, appended claims, and accompanying drawings where:

FIG. 4a is an illustration of "link-based" restoration leading to over and under utilization within a network;

FIG. 4b is an illustration of "node-based" restoration leading to a more efficiently utilized network after restoration;

DETAILED DESCRIPTION OF THE INVENTION

The present invention comprises a link metric and a set of distributed routing methods that maximize wavelength sharing among independent protection light paths. These methods support on-demand path computation, so complete information about traffic demand is not required. The link metric and distributed routing methods are implemented as a extensions of the existing IP routing protocols, e.g., open shortest path first (OSPF).

The resultant protection paths are optimized to reduce wavelength redundancy while working light paths are routed using minimum-hop paths thus separating optimization of the working path selection and protection path selection.

Figure 1:
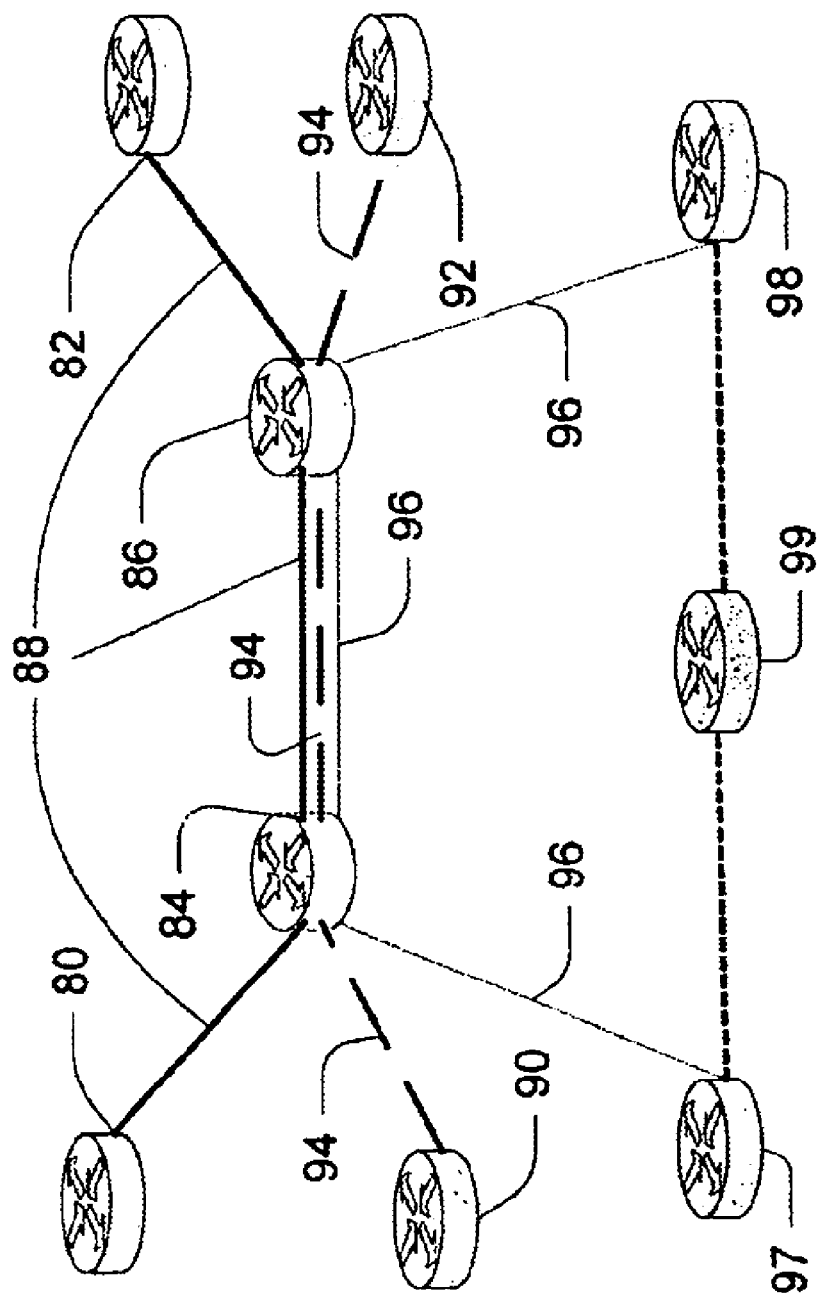
FIG. 1 is an illustration of a WDM optical network.

FIG. 1 is an illustration of a WDM optical network. A plurality of OXCs are connected in a network and communicate with their neighbors using a plurality of wavelengths wherein separate communication channels correspond to the separate wavelengths supported by each OXC in the network. A first source OXC 80 is operably coupled to a first terminal OXC 82 via first intermediate OXCs 84 and second intermediate OXC 86. The fist source OXC communicates to the first terminal OXC via a first wavelength 88. A second source OXC 90 is operably coupled to a second terminal OXC 92 via the first and second intermediate OXCs along with the first source and terminal OXCs. However, the second source and terminal OXCs use a different wavelength 94 than the first source and terminal OXCs. This leaves at least one wavelength 96 in the connection between the first and second intermediate OXCs free for reservation as a link in a protection path. For example, a third source OXC 97 is operably coupled to a third terminal OXC 98 via a third intermediate OXC 99. If the third intermediate OXC fails, the first and second intermediate OXCs can be used as an alternative path for the third source and terminal OXCs because the first and second intermediate OXCs have a wavelength reserved for the third source and terminal OXC's use.

Figure 2:
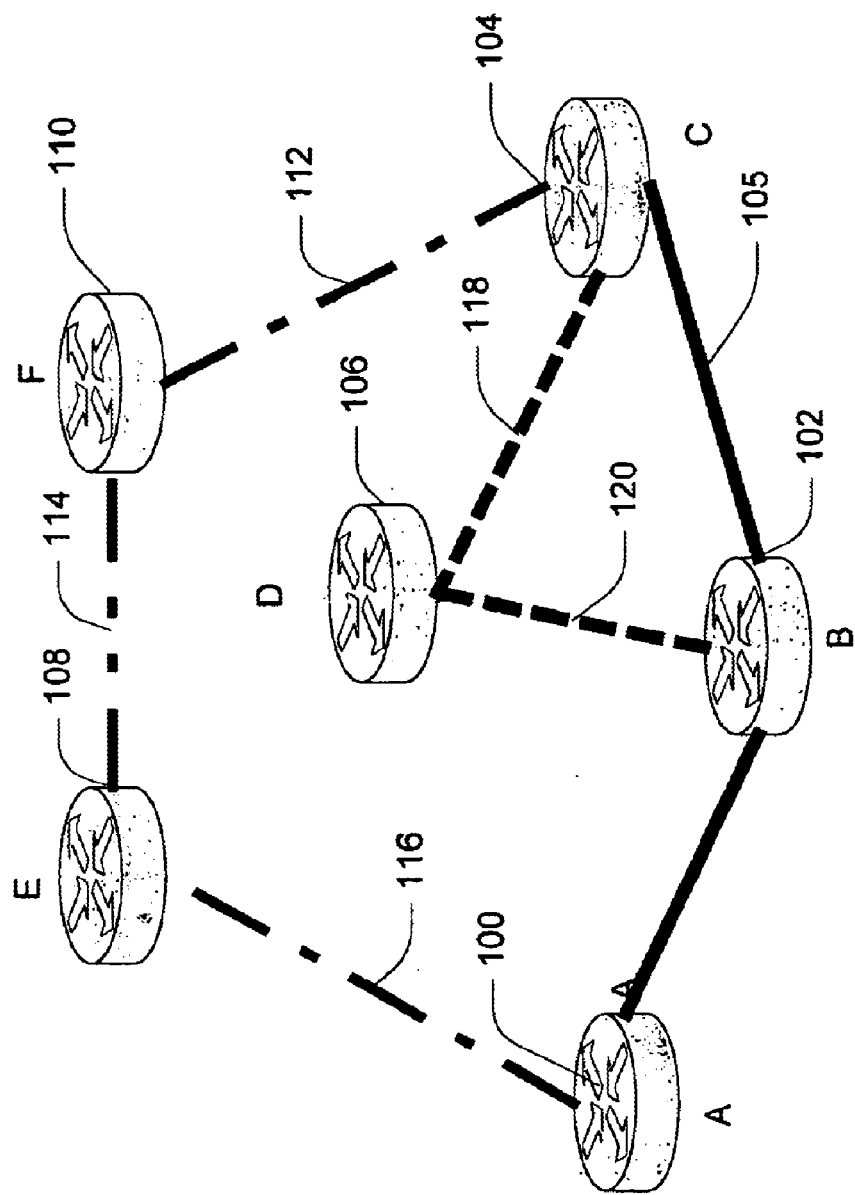
FIG. 2 is an illustration an exemplary WDM network having a working path and a plurality of possible protection paths.

FIG. 2 is an illustration of an exemplary WDM network having a working path and a plurality of possible protection paths. The exemplary network consists of nodes A 100, B 102, C 104, D 106, E 108, and F 110. A working pathway between A and C is denoted with a solid line linking A to C through B. In the case of a link failure within the working pathway, for example a link from B to C 105, A's traffic to C can be rerouted through E and F to reach C as denoted by the pathway denoted by the dotted and dashed links, 112, 114, and 116, between A, E, F, and C. This is an example of pathway protection as the entire pathway from A to C is protected by an alternate pathway.

Alternatively, the link between B and C can be protected by rerouting the link's traffic through D as noted by the dashed links 118 and 120. The alternate route through D is therefore a protection path for the B to C link. This is an example of link protection.

Given a description of a WDM network, G(N,E) where N is the set of nodes and E is the set of links, there exists a set of demands U which request light-paths to be established across the networks. These demands are protected by link-based restoration paths. For example, each link (i,j) on the working path of demand u∈U is protected by an alternative path connecting i and j. Let $x_{(i,j)}^u$ denote the amount of reserved wavelengths on link (i,j) in order to carry the traffic of demand u. Similarly let $y_{(m,n)}^{(i,j,u)}$ be the wavelength reservation on link (m,n) for demand u in case link(i,j) fails. Therefore, $x_{(i,j)}^u$ and $y_{(m,n)}^{(i,j,u)}$ denote the routing of working and protection paths respectively.

This problem formulation fits well into a centralized management paradigm where the Network Management System (NMS) may optimally configure every protection path, utilizing the complete knowledge of the demand set U. However, such an off-line algorithm is not desirable in an environment where the demands for light-paths arrive and depart dynamically. It is costly to reconfigure the whole network whenever traffic demands change. Instead, an online protection routing algorithm may be preferred in a dynamic environment.

An online algorithm determines the protection routing based on the existing network status. Nor is it assumed that all future demands are known or the existing demands can be rerouted. Thus the objective of an online algorithm is to minimize the marginal wavelength requirement due to any newly arrived demand u*. Suppose the working path $x_{(i,j)}^u$ has been determined by the minimum-hop path. An optimization problem can be formulated to determine the protection path, i.e., $y_{(m,n)}^{(i,j,u)}$:

$$\min\left(\sum_{(m,n)\in L} \Delta w_{(m,n)}\right)$$

subject to:

$$\sum_n y^{(i,j,u^*)}_{(m,n)} - \sum_n y^{(i,j,u^*)}_{(n,m)} = \begin{cases} x^{u^*}_{(i,j)} & m = i \\ -x^{u^*}_{(i,j)} & m = j \\ 0 & m \neq i, m \neq j \end{cases}$$

$$b^{(i,j)}_{(m,n)} = \begin{cases} 0 & \text{if } w^{(i,j)}_{(m,n)} + 1 \leq w_{(m,n)} \\ 1 & \text{otherwise} \end{cases}$$

$$\Delta w^{(i,j)}_{(m,n)} \geq b^{(i,j)}_{(m,n)} \times y^{(i,j,u^*)}_{(n,m)}$$

$$y^{(i,j,u^*)}_{(n,m)} \in \{0, 1\}$$

In the above constraints, $B_{(m,n)}^{(i,j)}$ is the additional wavelength requirement on link (m, n) if link (m,n) is used by u* to restore from the failure of link (i, j). The additional wavelength requirement is based on the reservation sharing with other failures.

Determining $y_{(m,n)}^{(i,j,u^*)}$ is therefore equivalent to finding the minimum-cost alternative path from i to j, and the existing network status can be aggregated into $w_{(m,n)}^{(i,j)}$ and $w_{(m,n)}$. As a result, the protection routing problem in WDM networks draws upon shortest path routing algorithms in data networks.

The following is a link metric that provides the necessary network state information in an aggregated form. The link metric is used in an online protection routing method that fits into the framework of current Internet routing.

The link metric provides protection paths for different link failures by sharing protection wavelengths since the protection paths need not to be activated at the same time.

The link metric uses a "bucket-based" link state representation. In the network G(N,E), each link l ∈E maintains a set of "buckets", $h_l = (h_l^k, k \in E, k \neq l)$. Each bucket, $h_l^k$, corresponds to a failure event k, and the "height" of the bucket, i.e., the value of $h_l^k$, indicates the protection wavelengths reserved on link l for the failure event k. In terms of the notation in the statement of the optimization problem, we have the correspondence $h_l^k = w_{(m,n)}^{(i,j)}$ for link l=(m,n) and failure k=(i,j). The number of wavelengths needed to be reserved is equal to the maximum of the bucket heights or $\max_k h_l^k$. Thus the necessary information on the sharing potential offered by each link is captured by maintaining a sequence of values indexed by the failure events.

Figure 3:
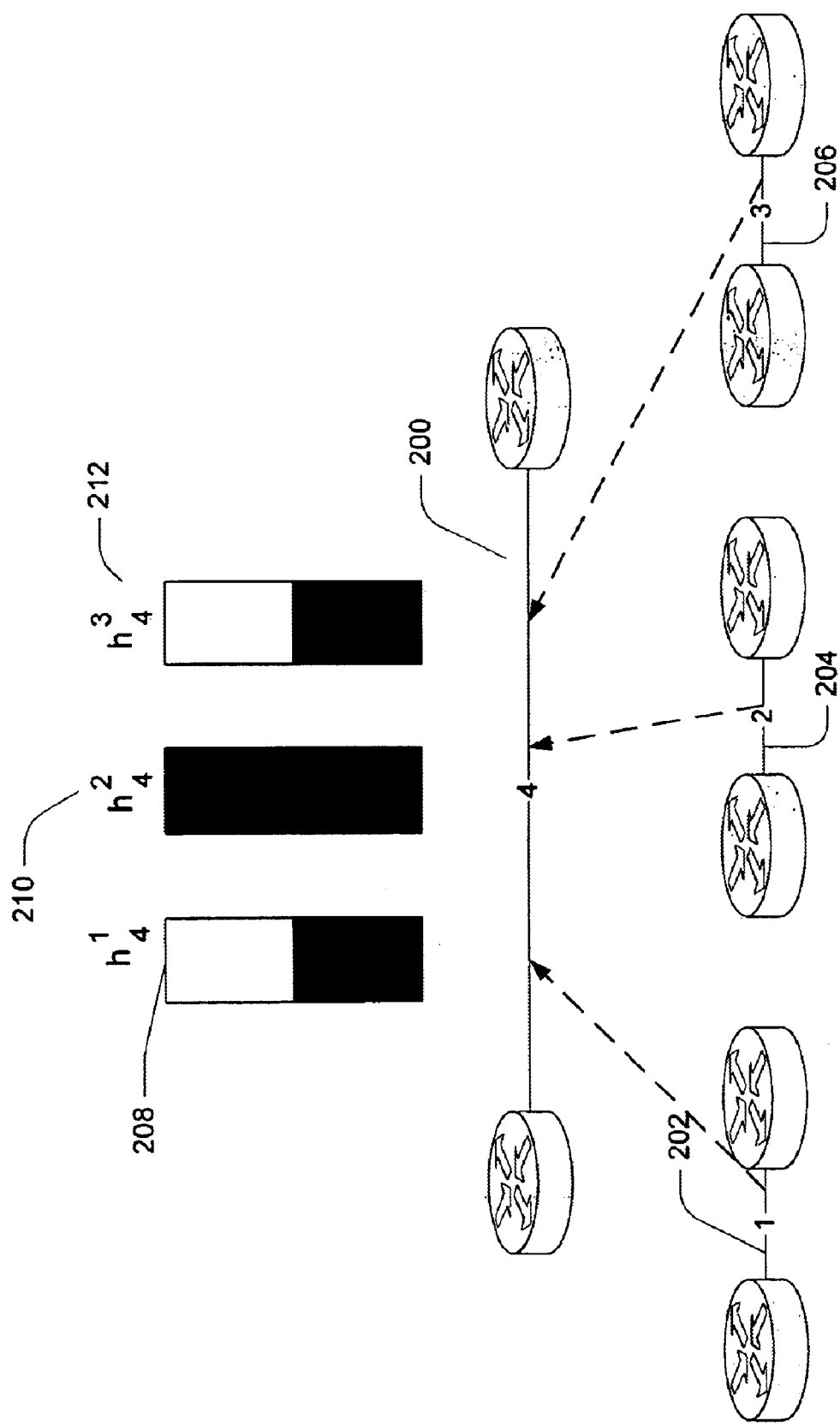
FIG. 3 is an illustration of an embodiment of a link metric comprising "buckets" to store wavelength reservations according to the present invention.

The sharing potential is a function of the failure event. For example, in FIG. 3, link 4 200 can serve as a link in a protection path for link 1 202, link 2 204, and link 3 206. Link 4 therefore maintains three buckets: bucket $h_4^1$ 208 for link 1, bucket $h_4^2$ 210 for link 2, and bucket $h_4^3$ 212 for link 3. In this example, link 4 has reserved two wavelengths for link 2 and only one wavelength for links 1 and 3. This indicates that in order to protect an additional wavelength on link 2, link 4 has to reserve an extra wavelength if it is selected as part of a protection path for link 2. On the contrary, to protect an additional wavelength on links 1 or 3, no extra wavelength needs to be reserved. This is because link 4 has already reserved two wavelengths for link 2 and the reservation of these two wavelengths can be shared with either link 1 or 3, thus not requiring the allocation of another wavelength.

In one embodiment of the present invention, the previously described link metric is coupled with a "shortest-widest" algorithm within a process to determine a protection path through a network for a particular link. The "width", l_width (l,k*), of a link 1 with respect to a link failure k*, is defined as the normalized difference between the maximum bucket height, $\max_k h_l^k$, and the bucket corresponding to link failure k*. The width is calculated as:

$$\text{l\_width}(l, k^*) = 1 - \frac{h_l^{k^*}}{\max_k h_l^k}$$

if $\max_k h_l^k > 0$ and 0 if otherwise. Therefore, l_width(l,k*) is between 0 and 1, and this value indicates the sharing capability link 1 has to offer for the protection of the failure k* i.e., the greater the value the greater the sharing capability. If the value of a l_width(l,k*) is 0, then the link is said to be "exhausted" and must reserve an additional wavelength if it is to serve as a link in a protection path.

In one embodiment of the invention, a modified Bellman-Ford algorithm is used to identify the widest paths between the end nodes of the protected link, i.e., the path that offers the most sharing. Here the width of the path p with respect to a link failure k*, p_width(p,k*), is defined to be the minimum of its link components, i.e., p_width (p,k*)= $\min_{l \in p}$ l_width (l,k*).

By this definition the marginal cost of traversing a path is dictated by the "narrowest" links along the path. In the event that there are more than one such path candidates, and their widths are all 0 (i.e., these paths all go through links with non-zero marginal wavelength consumption), the link traversing the least number of "exhausted" links, i.e., the links of width 0, is selected. On all other cases of tie breaking with positive path width, i.e., the marginal costs are zero, a widest path is randomly selected. The above described protection path selection method requires only the current demand and no knowledge of future arrivals to determine an efficient protection path.

In one embodiment of the present invention, the above described link-based protection path selection method is modified to be a node-based protection path selection method. The previously described "bucket"-based link metric and corresponding shortest-widest routing algorithm are based on the loss of an optical signal caused by a link failure. The resultant calculated protection paths are constrained to go from one end of the protected link to the other end. Being forced to go from one end of the failure link to the other end, even for the traversing demands that are destined to different nodes, the group of restoration paths may unwittingly clog the "local area" and under-utilize the potential sharing capability in the network. FIGS. 4a and 4b illustrate this situation.

FIG. 4a is a diagram illustrating the demands of two working paths sharing a single link. A first source node 400 is operably coupled to a first terminal node 401 through a first intermediate node 402, and a second intermediate node 403 thus creating a first link 405 between the first intermediate node and the second intermediate node. A second source node 406 is operably coupled to a second terminal node 407 through the first and second intermediate nodes thus creating a second link 410 between the first and second intermediate nodes.

With link-based restoration, a protection paths for the demands from the first and second source nodes to the first and second terminal nodes begin at the first intermediate node and terminate at the second intermediate node. This creates two protection paths 414 and 416 passing through a third intermediate node 412. This may limit the possible inclusion of alternative protection paths including fourth intermediate node 418.

Alternatively, if protection paths are selected such that they start from the first intermediate node and end at a fifth intermediate node 404 and a sixth intermediate node 408 respectively, there is a better chance for the exploitation of "network-wide" sharing potential including the third intermediate node.

FIG. 4b is an alternative solution to the restoration problem of FIG. 4a. This restoration solution is herein termed a "node-based" restoration solution. A first source node 400 is operably coupled to a first terminal node 401 through a first intermediate node 402, and a second intermediate node 403 thus creating a first link 405 between the first intermediate node and the second intermediate node. A second source node 406 is operably coupled to a second terminal node 407 through the first and second intermediate nodes thus creating a second link 410 between the first and second intermediate nodes.

With a node-based restoration scheme, protection paths for the demands from the first and second source nodes to the first and second terminal nodes begin at the first intermediate node and terminate at the fifth and sixth intermediate nodes respectively. This creates two protection paths. A first protection path 419 passes through a third intermediate node 412. A second protection path 420 passes through a third intermediate node 418. These alternative protection paths include a "network-wide" sharing potential not available in a link-based protection path scenario.

Figure 5A:
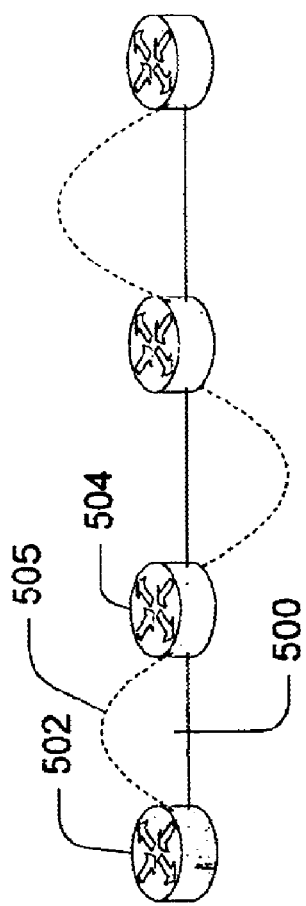
FIGS. 5a and 5b illustrate "node-based" restoration for multiple intermediate nodes in a network.
Figure 5B:
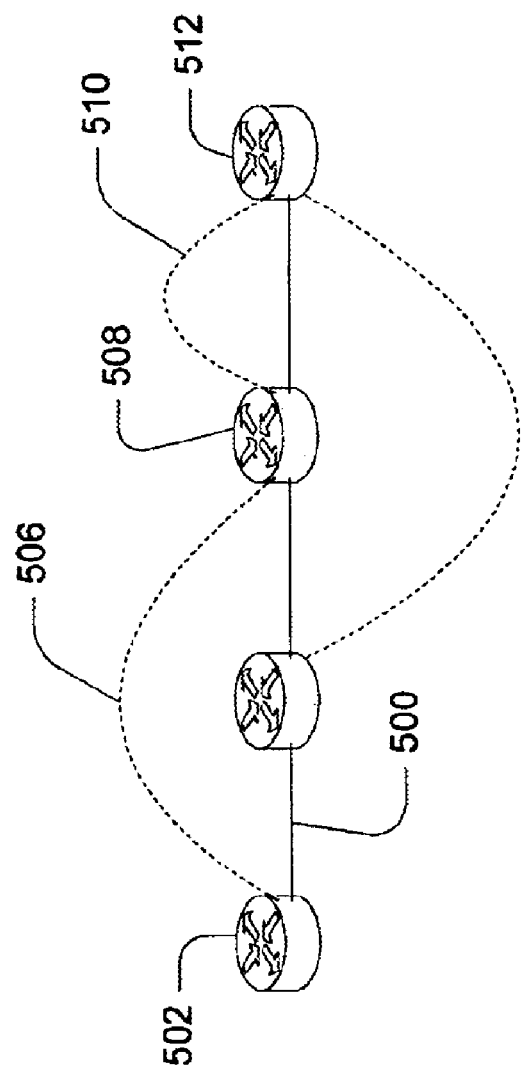

FIGS. 5a and 5b illustrate another restoration mechanism, wherein the protection path for a given link ends at the node two hops away on the corresponding working path. This restoration mechanism is also a form of node-based restoration. For example, in FIG. 5a, protection path 505 is a link-based protection path protecting link 500 between a source node 502 to a first intermediate node 504. Alternatively, in FIG. 5b, a protection path 506 protecting link 500 is constructed linking a source node 500 to a second intermediate node 508. A special case of a node-based protection path is protection path 510 linking the second intermediate node to a terminal node 512. In this case, the node-based protection path has the same end nodes as its link-based counterpart, since the terminal node is the destination and there are no nodes further down the working path.

A failed node may also cause disrupted service, in which case all links adjacent to the failed node will "fail" simultaneously. Under such condition, the construction of the protection path for a particular link should consciously exclude the links that are experiencing a problem at the same time. However, differentiation of a link or nodal failure often takes time and causes undesirable delay in service restoration. In certain cases it is more advantageous to be conservative, i.e., to use nodal failure as the general model of the failure event, and treat a single link failure as a special case. The node-based "jump-ahead" operation proposed above is well suited to implement such a strategy.

Figure 6:
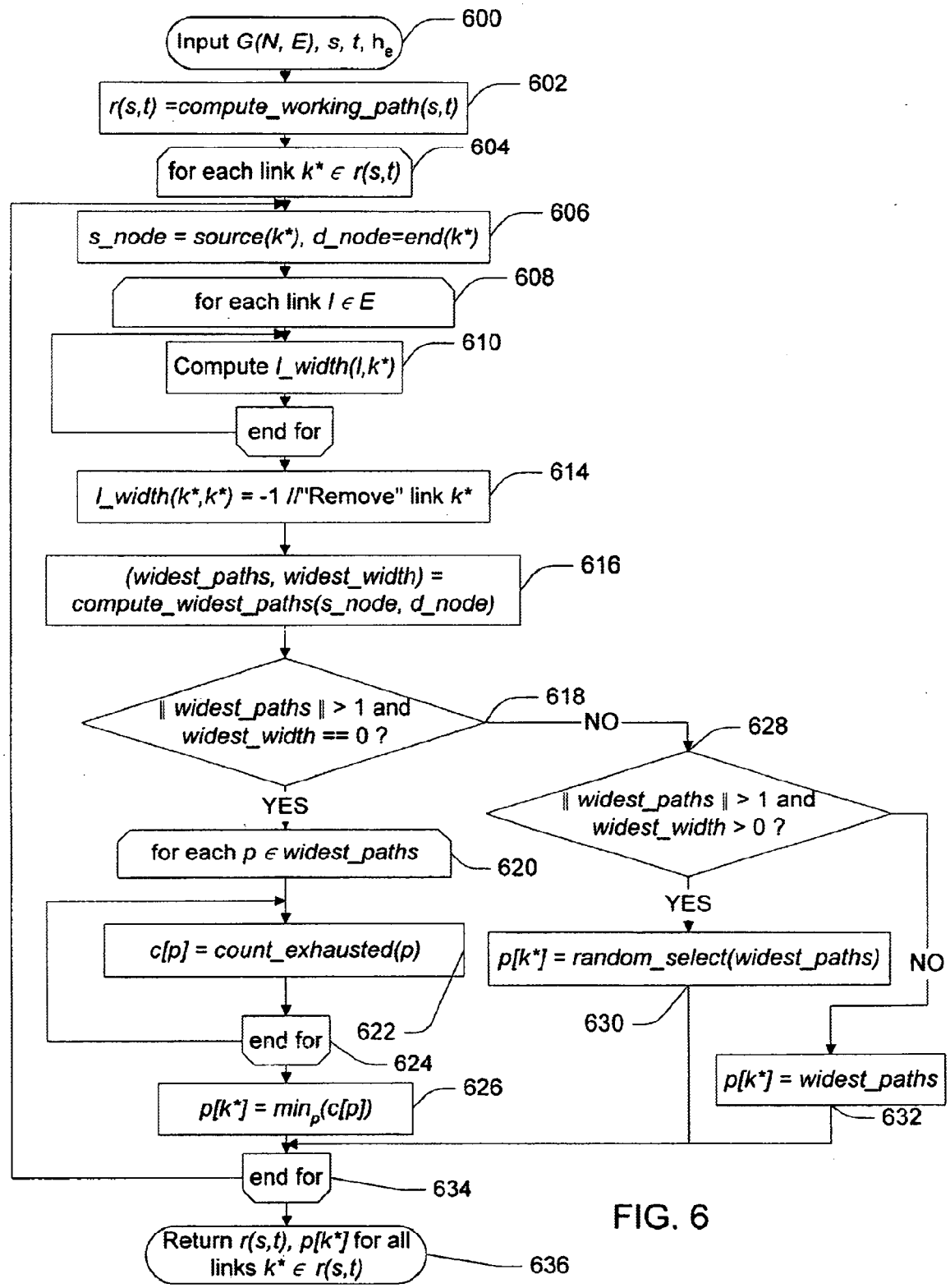
FIG. 6 is a process flow diagram of a path selection process according to the present invention.

FIG. 6 is a process flow diagram depicting one embodiment of a path selection process according to the present invention. The path selection process accepts as input 600: a description of the networks as G(N,E) where N is a set of nodes and E is a set of links between the nodes of N; a source node to which a path is to be found to t a terminal node; and a set of vectors of previously described link metrics associated with each link in E, $h_e$.

The path selection process determines a working path of links, r(s,t), between s and t 602. Each link in the working path is capable of failing and generating a failure event; therefore, for each link in the working path there is a corresponding possible link failure, k*. For each possible link failure in the working path the path selection process determines a protection path 604.

The path selection process determines a start node, s_node, and a destination node, d_node, for the possible link failure k* 606.

From the start node, a width for each link in the network 608 is calculated 610 as previously described using link metrics taken from $h_e$. The width of the possible link failure back to itself is removed from consideration as a protection path 614.

Using the set of widths calculated at step 608, the path selection process determines a set of possible protection paths, widest_paths, and determines the width of the widest protection path, widest_width, using the previously calculated widths. If the width of the widest possible protection path through all of the possible protection paths is zero, this means all of the possible protection paths in the set widest_paths include at least one exhausted link as previously described.

If the number of possible protection paths in widest_paths is greater than one and the widest width is equal to zero 618, the path selection process selects a protection path for possible link failure k*, p[k*], by selecting the protection path in the set of possible protection paths containing the least number of exhausted links, steps 620, 622, and 626.

If the widest width is greater than zero and there is more than one possible protection path in the set widest_paths 628, the path selection process selects a protection path for possible link failure k*, p[k*], at random from the set of possible protection paths 630.

If there is only a single possible protection path in the set of possible protection paths, then the single possible protection path in the set of possible protection paths is selected by the path selection process 632 as the protection path for possible link failure k*, p[k*].

The path selection process continues selecting protection paths until it has selected a protection path for each possible link failure in the working path 634.

The path selection process returns r(s,t) which is the working path, and a set of protection paths for all of the possible link failures in the working path.

Figure 7:
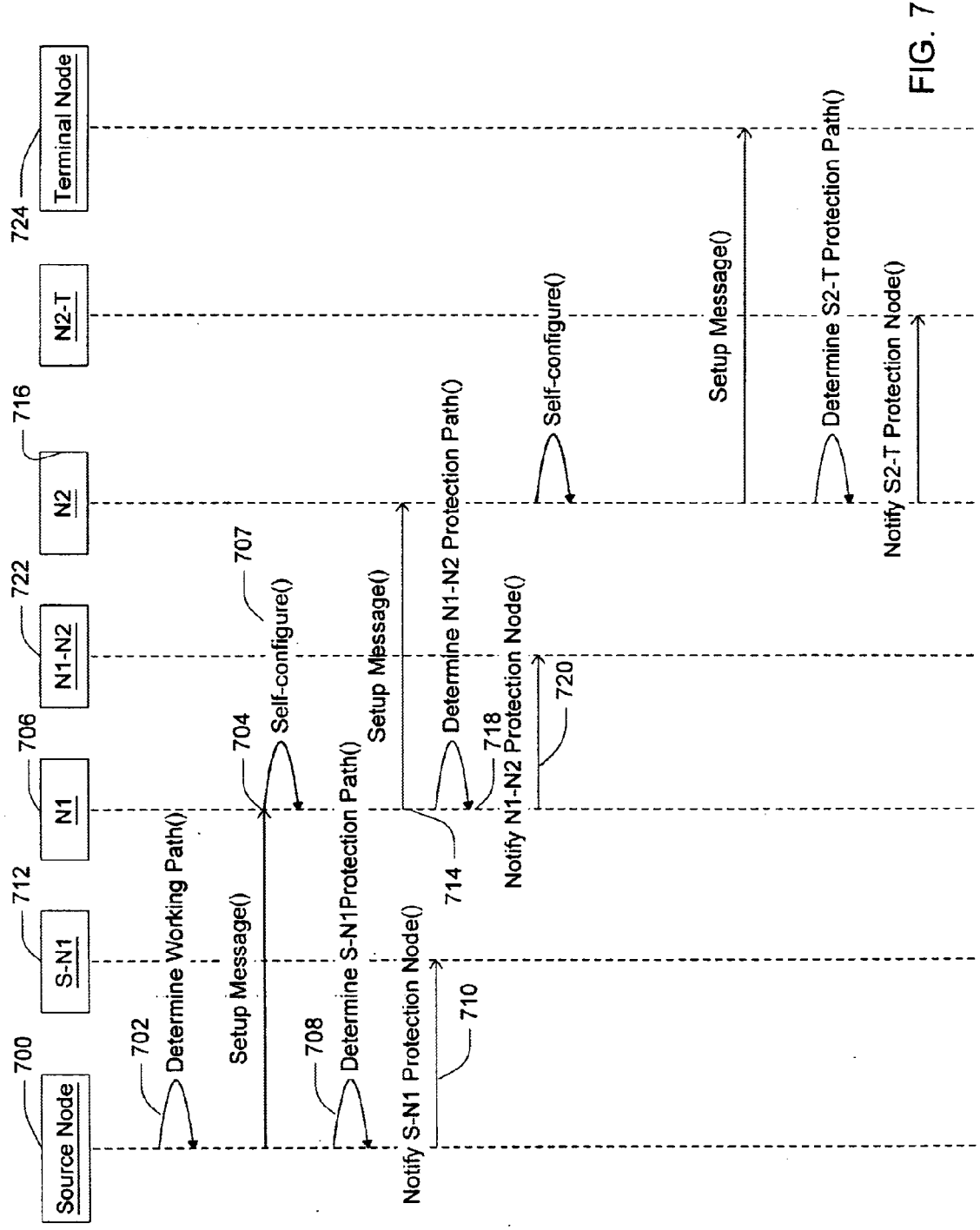
FIG. 7 is a sequence diagram of an embodiment of a distributed protection path selection process according to the present invention as applied to an exemplary network.

In another embodiment of the present invention, the process depicted in FIG. 6 is distributed across a network with each node in a pathway determining a protection path for its link to the next node in the pathway. FIG. 7 depicts the process of FIG. 6 distributed across a pathway through a network.

FIG. 7 is a sequence diagram of an embodiment of a distributed protection path selection process according to the present invention as applied to an exemplary network. In response to a request to establish a light-path through a network, source node 700 computes the end-to-end working path as previously described in step 602 (FIG. 6). In this example, the working path is source node to node N1 706 to node N2 716 to terminal node 724.

The source node sends a setup message 704 to node N1. The setup message includes the working path so that node N1 knows the next node in the working path. Node N1 configures itself 707 to be part of the working path.

The source node determines a protection path for the source nodes's link to node N1 as previously described in steps 606–634 (FIG. 6). The source node signals all related nodes to do a proper configuration. In this example, node S-N1 721 is selected as a node in a protection path for the link between the source node and node N1. The source node sends a notification 710 to node S-N1 so that node S-N1 will reserve a wavelength for protection of the link between the source node and node N1.

Node N1 forwards the setup message 714 to the next node in the pathway, node N2. Node N1 doesn't determine the next node in the pathway as the source node has included the pathway in the setup message. However, node N1 is responsible for selecting a protection path to protect the link between node N1 and node N2. Node N1 computes a protection path for the link between node N1 and node N2 as previously described in steps 606–634 (FIG. 6) 718.

In this example, node N1–N2 722 is selected as a node in a protection path for the link between node N1 and node N2. Node N1 sends a notification message 720 to node N1–N2 so that node N1–N2 can reconfigure itself as a node in a protection path.

Each node in the working pathway repeats the process of configuring itself as part of the working path, signaling the next node in the working path, determining a protection path for the link to the next node in the working path, and signaling the nodes along the protection path to configure themselves for use in a protection path.

Figure 8:
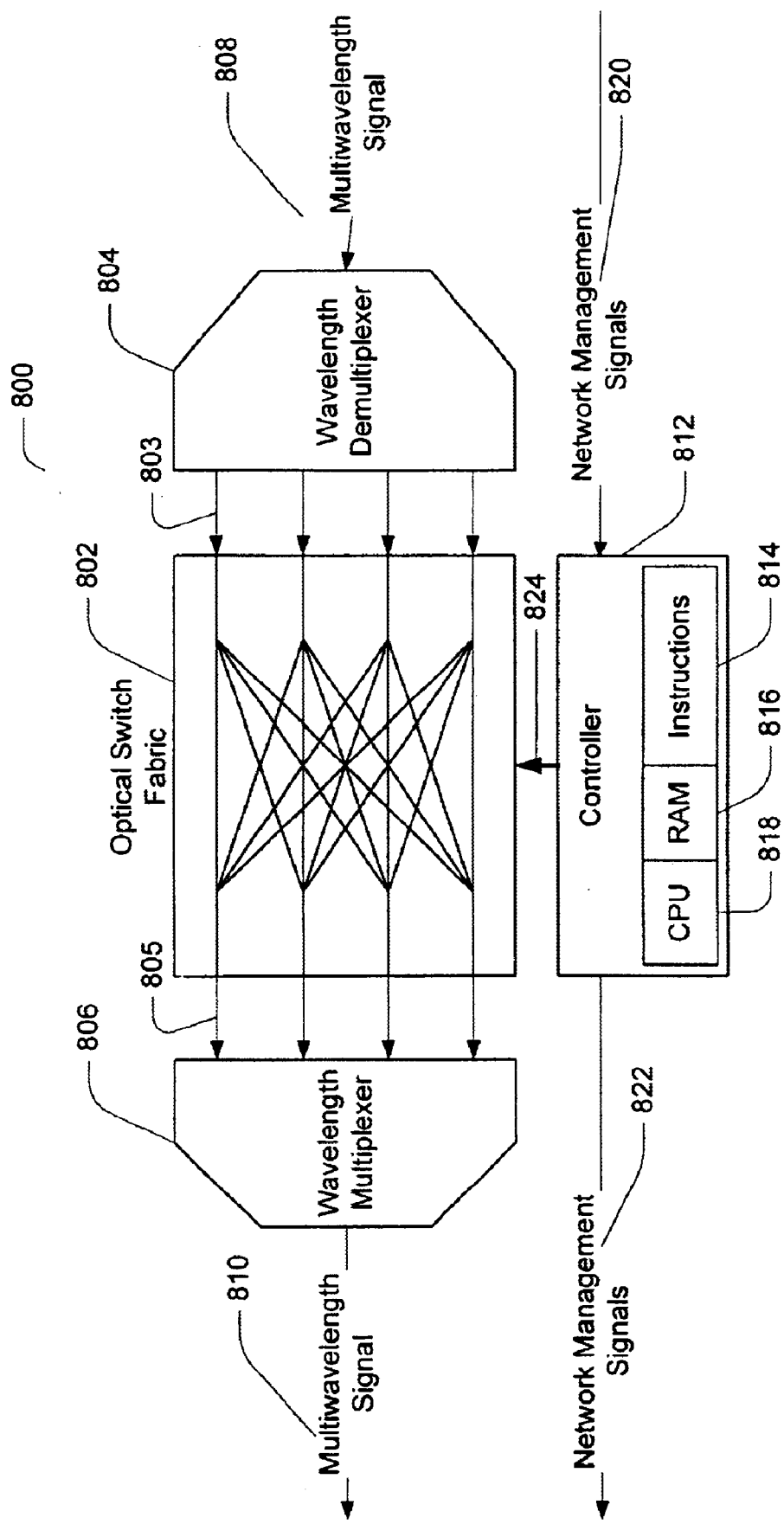
FIG. 8 is an architecture diagram of an exemplary WDM OXC.

FIG. 8 is an architecture diagram of an exemplary embodiment of an OXC. The exemplary OXC 800 comprises an optical switch fabric 802 for switching a plurality of optical inputs 803 between a plurality of optical outputs 805, a wavelength demultiplexer 804 operably coupled to the plurality of optical inputs for separating out the separate wavelengths in an input multi-wavelength signal 808, a wavelength multiplexer 806 operably coupled to the plurality of optical outputs for combining the optical outputs into a single multi-wavelength output signal 810.

The optical switch fabric is operably coupled to a controller. The controller determines which of the plurality of optical inputs to switch between the plurality of optical outputs and sends appropriate switching control signals 824 to the optical switch fabric.

The controller includes a processor 818 for execution of controller instructions 814 implementing the previously described distributed protection path selection method. The controller includes a Random Access Memory (RAM) for storage of intermediate results while calculating protection paths and for storage of previously described bucket data.

The controller receives input network management signals 820 from other OXCs in a network. The network management signals include information about the configuration of other OXCs in the network including the previously described bucket information. The input network management signals also include previously described setup messages from other OXCs requesting the exemplary OXC to reconfigure itself to be a node in a working pathway and notification messages requesting the exemplary OXC to reconfigure itself as a node in a protection pathway.

The controller transmits output network management signals to other nodes in the network. The output network management signals include information about the configuration of the exemplary OXC including previously described bucket information about the number of wavelengths used and reserved by the exemplary OXC. The output network management signals also include setup messages requesting the other nodes to reconfigure themselves as nodes in a working pathway. The output network management signals also include notification messages requesting other nodes to reconfigure themselves a nodes in a protection pathway.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

What is claimed is:

1. A method for determining a protection path for a failure event link in an optical network of a set of nodes interconnected a set of links, the method comprising:

receiving a set of link metrics corresponding to wavelength reservations for a set of protected links on a set of protection path links;

calculating a set of widths using the set of ink metrics, each width corresponding to a capacity of a protection path link to protect the failure event link, wherein a width of a protection path link is a normalized difference between a maximum wavelength reservation on the protection path link and a wavelength reservation on the protection path link for the failure event link;

calculating a protection path including protection path links for the failure event link using the set of widths;

determining a set of possible protection paths;

determining a protection path maximum width for the set of possible protection paths; and selecting a protection path from the set of possible protection paths using the protection path maximum with.

2. The method of claim 1, wherein determining a protection path maximum width further comprises:

determining a set of possible protection path widths from the set of possible protection paths; and selecting a maximum possible protection path width from the set of possible protection path widths.

3. The method of claim 2, wherein the width of a possible protection path is a minimum of widths of the protection path links included in the possible protection path.

4. The method of claim 1, wherein the protection path maximum width is a minimum with of the protection path links included in the possible protection paths.

5. The method of claim 1 wherein selecting a protection path from the set of possible protection paths further comprises randomly selecting a protection path if the protection path maximum width is greater than zero.

6. The method of claim 1 wherein selecting a protection path from the set of possible protection paths further comprises:

determining the number of protection path links of zero width included in each possible protection path; and selecting the possible protection path with the fewest number of protection path links of zero width.

7. A method for establishing a protected working path from a source node to a terminal node in an optical network of a set of nodes interconnected by a set of links, the method comprising:

determining by the source node a working path including a set of working path nodes and a set of working path links;

transmitting to a first working path node from the source node a setup message including the protected working path;

determining a working path link linking the source node and the first working path node;

receiving a set of link metrics corresponding to wavelength reservations for a set of protected links on a set of protection path links;

calculating a set of widths using the set of ink metrics, each width corresponding to a capacity of a protection path link to protect the working path link, wherein a width of a protection path link is a normalized difference between a maximum wavelength reservation on the protection path link and the wavelength reservation on the protection path ink for the working path link;

calculating a protection path including protection path links for the working path link using the set of widths;

determining a set of possible protection paths;

determining a protection path maximum width for the set of possible protection paths; and selecting a protection path from the set of possible protection paths using the protection path maximum with.

8. The method of claim 7, wherein determining the protection path maximum width further comprises:

determining a possible protection path width or each of the possible protection paths in the set of possible protection paths; and selecting a maximum possible protection path width.

9. The method of claim 8, wherein the width of a possible protection path is a minimum of widths of the protection path links included in the possible protection path.

10. The method of claim 7, wherein determining the protection path maximum width further comprises determining a minimum width of the protection path links included in the possible protection paths.

11. The method of claim 7, wherein selecting a protection path from the set of possible protection paths further comprises randomly selecting a protection path from the set of possible protection paths if the protection path maximum width is greater than zero.

12. The method of claim 7 wherein selecting a protection path from the set of possible protection paths further comprises:

determining the number of protection path links of zero width included in each possible protection path; and selecting the possible protection path with the fewest number of protection path links of zero width.

13. A method for establishing a protected working path from a source node to a terminal node in an optical network of a set of nodes interconnected by a set of links, the method comprising:

receiving by a node from a prior node a first setup message including a working path including a set of working path nodes and a set of working path links;

transmitting to a working path node from the no e a second setup message including the protected working path;

determining a working path link linking the node and the working path node;

receiving a set of link metrics corresponding to wavelength reservations for a set of protected links on a set of protection path links;

calculating a set of widths using the set of link metrics, each width corresponding to a capacity of a protection path link to protect the working path link, wherein a width of a protection path link is a normalized difference between a maximum wavelength reservation on the protection path link and the wavelength reservation on the protection path link for the working path link;

calculating a protection path including protection path links for the working path link using the set of widths;

determining a set of possible protection paths;

determining a protection path maximum width for the set of possible protection paths; and selecting a protection path from the set of possible protection paths using the protection path maximum width.

14. The method of claim 13, wherein determining the protection path maximum width further comprises:

determining a possible protection path width or each of the possible protection paths in the set of possible protection paths; and selecting a maximum possible protection path width.

15. The method of claim 14, wherein the width of a possible protection path is a minimum of widths of the protection path links included in the possible protection path.

16. The method of claim 13, wherein determining the protection path maximum width further comprises determining a minimum width of the protection path links included in the possible protection paths.

17. The method of claim 13, wherein selecting a protection path from the set of possible protection paths further comprises randomly selecting a protection path from the set of possible protection paths if the protection path maximum width is greater than zero.

18. The method of claim 13, wherein selecting a protection path from the set of possible protection paths further comprises:

determining the number of protection path links of zero width included in each possible protection path; and selecting the possible protection path with the fewest number of protection path links of zero width.

19. A data processing system adapted to determine a protection path for a failure event link in an optical network of a set of nodes interconnected by a set of links, comprising:

a processor; and a memory operably coupled to the processor and having program instructions stored therein, the processor being operable to execute the program instructions, the program instructions including:

receiving a set of link metrics corresponding to wavelength reservations for a set of protected links on a set of protection path links;

calculating a set of widths using the set of link metrics, each width corresponding to a capacity of a protection path link to protect the failure event link, wherein a width of a protection path link is a normalized difference between a maximum wavelength reservation on the protection path link and a wavelength reservation on the protection path link for the failure event link;

calculating a protection path including protection path links for the failure event link using the set of widths;

determining a set of possible protection paths;

determining a protection path maximum width for the set of possible protection paths; and selecting a protection path from the set of possible protection paths using the protection path maximum width.

20. The data processing system of claim 19, wherein the program instructions for determining a protection path maximum width further include:

determining a set of possible protection path widths from the set of possible protection paths; and selecting a maximum possible protection path width from the set of possible protection path widths.

21. The data processing system of claim 20, wherein the width of a possible protection path is a minimum of widths of the protection path links included in the possible protection path.

22. The data processing system of claim 19, wherein the protection path maximum width is a minimum width of the protection path links included in the possible protection paths.

23. The data processing system of claim 19, wherein the program instructions for selecting a protection path from the set of possible protection paths further include randomly selecting a protection path if the protection path maximum width is greater than zero.

24. The data processing system of claim 19, wherein the program instructions for selecting a protection path from the set of possible protection paths further include:

determining the number of protection path links of zero width included in each possible protection path; and selecting the possible protection path with the fewest number of protection path links of zero width.

25. A data processing system adapted to establish a protected working path from a source node to a terminal node in an optical network of a set of nodes interconnected by a set of links, comprising:

a processor; and a memory operably coupled to the processor and having program instructions stored therein, the processor being operable to execute the program instructions, the program instructions including:

determining by the source node a working path including a set of working path nodes and a set of working path links;

transmitting to a first working path node from the source node a setup message including the protected working path;

determining a working path link linking the source node and the first working path node;

receiving a set of link metrics corresponding to wavelength reservations for a set of protected links on a set of protection path links;

calculating a set of widths using the set of link metrics, each width corresponding to a capacity of a protection path link to protect the working path link, wherein a width of a protection path link is a normalized difference between a maximum wavelength reservation on the protection path link and the wavelength reservation on the protection path ink for the working path link;

calculating a protection path including protection path links for the working path link using the set of widths, determining a set of possible protection paths;

determining a protection path maximum width for the set of possible protection paths; and selecting a protection path from the set of possible protection paths using the protection path maximum with.

26. The data processing system of claim 25, wherein the program instructions for determining the protection path maximum width further include:

determining a possible protection path width or each of the possible protection paths in the set of possible protection paths; and selecting a maximum possible protection path width.

27. The data processing system of claim 26, wherein the width of a possible protection path is a minimum of widths of the protection path links included in the possible protection path.

28. The data processing system of claim 25, wherein the program instructions for determining the protection path maximum width further include determining a minimum width of the protection path links included in the possible protection paths.

29. The data processing system of claim 25, wherein the program instructions for selecting a protection path from the set of possible protection paths further include randomly selecting a protection path from the set of possible protection paths if the protection path maximum width is greater than zero.

30. The data processing system of claim 25, wherein the program instructions for selecting a protection path from the set of possible protection paths further include:

determining the number of protection path links of zero width included in each possible protection path; and selecting the possible protection path with the fewest number of protection path links of zero width.

31. A data processing system adapted to establish a protected working path from a source node to a terminal node in an optical network of a set of nodes interconnected by a set of links, comprising:

a processor; and a memory operably coupled to the processor and having program instructions stored therein, the processor being operable to execute the program instructions, the program instructions including:

receiving by a node from a prior node a first setup message including a working path including a set of working path nodes and a set of working path links;

transmitting to a working path node from the node a second setup message including the protected working path;

determining a working path link linking the node and the working path node;

receiving a set of link metrics corresponding to wavelength reservations for a set of protected links on a set of protection path links;

calculating a set of widths using the set of link metrics, each width corresponding to a capacity of a protection path link to protect the working path link, wherein a width of a protection path link is a normalized difference between a maximum wavelength reservation on the protection path link and the wavelength reservation on the protection path link for the working path link;

calculating a protection path including protection path links for the working path link using the set of widths;

determining a set of possible protection paths;

determining a protection path maximum width for the set of possible protection paths; and selecting a protection path from the set of possible protection paths using the protection path maximum width.

32. The data processing system of claim 31, wherein the program instructions for determining the protection path maximum width further include:

determining a possible protection path width for each of the possible protection paths in the set of possible protection paths; and selecting a maximum possible protection path width.

33. The data processing system of claim 32, wherein the width of a possible protection path is a minimum of widths of the protection path links included in the possible protection path.

34. The data processing system of claim 31, wherein the program instructions for determining the protection path maximum width further include determining a minimum width of the protection path links included in the possible protection paths.

35. The data processing system of claim 31, wherein the program instructions for selecting a protection path from the set of possible protection paths further include randomly selecting a protection path from the set of possible protection paths if the protection path maximum width is greater than zero.

36. The data processing system of claim 31, wherein the program instructions for selecting a protection path from the set of possible protection paths further include:

determining the number of protection path links of zero width included in each possible protection path; and selecting the possible protection path with the fewest number of protection path links of zero width.

37. A computer-readable storage medium embodying computer program instructions for execution by a computer, the computer program instructions adapting a computer to determine a protection path of a failure event link in an optical network of a set of nodes interconnected by a set of links, the computer instructions comprising:

receiving a set of link metrics corresponding to wavelength reservations for a set of protected links on a set of protection path links;

calculating a set of widths using the set of link metrics, each width corresponding to a capacity of a protection path link to protect the failure event link, wherein a width of a protection path link is a normalized difference between a maximum wavelength reservation on the protection path link and a wavelength reservation on the protection path link for the failure event link;

calculating a protection path including protection path links for the failure event link using the set of widths;

determining a set of possible protection paths;

determining a protection path maximum width for the set of possible protection paths; and selecting a protection path from the set of possible protection paths using the protection path maximum width.

38. The computer-readable storage medium of claim 37, wherein the program instructions for determining a protection path maximum width further comprise:

determining a set of possible protection path widths from the set of possible protection paths; and selecting a maximum possible protection path width from the set of possible protection path widths.

39. The computer-readable storage medium of claim 38, wherein the width of a possible protection path is a minimum of widths of the protection path links included in the possible protection path.

40. The computer-readable storage medium of claim 38, wherein the protection path maximum width is a minimum width of the protection path links included in the possible protection paths.

41. The computer-readable storage medium of claim 37, wherein the program instructions for selecting a protection path from the set of possible protection paths further comprise randomly selecting a protection path if the protection path maximum width is greater than zero.

42. The computer-readable storage medium of claim 37, wherein the program instructions for selecting a protection path from the set of possible protection paths further comprise:

determining the number of protection path links of zero width included in each possible protection path; and selecting the possible protection path with the fewest number of protection path links of zero width.

43. A method for establishing protected working path from a source node to a terminal node in an optical network of a set of nodes interconnected by a set of links, the method comprising:

determining by the source node a working path including a set of working path nodes and a set of working path links;

transmitting to a first working path node from the source node a setup message including the protected working path;

determining a working path link linking the source node and the first working path node;

receiving a set of wavelength reservations for a set of protected links on a set of protection path links;

calculating a set of a normalized differences between a maximum wavelength reservation on a protection path link and a wavelength reservation on the protection path link for the working path link;

determining a set of possible protection path is for the working path link;

determining a set of possible protection path widths from the set of possible protection paths;

selecting a maximum possible protection path width from the set of possible protection path widths;

if the number of possible protection paths is greater than one and the possible protection path maximum width is greater than zero then randomly selecting a protection path;

if the number of possible protection paths is greater than one and the protection path maximum width is equal to zero then performing the following:

determining the number of protection path links of zero width included in each possible protection path; and selecting the possible protection path with the fewest number of protection path links of zero width; and if the number of possible protection paths is equal to one then selecting the one possible protection path.

44. A data processing system adapted to establish a protected working path from a source node to a terminal node in an optical network of a set of nodes interconnected by a set of links, comprising:

a processor; and a memory operably coupled to the processor and having program instructions stored therein, the processor being operable to execute the program instructions, the program instructions including:

determining by the source node a working path including a set of working path nodes and a set of working path links;

transmitting to a first working path node from the source node a setup message including the protected working path;

determining a working path link linking the source node and the first working path node;

receiving a set of wavelength reservations for a set of protected links on a set of protection path links;

calculating a set of a normalized difference between a maximum wavelength reservation on a protection path link and a wavelength reservation on the protection path link for the working path link;

determining a set of possible protection paths for the working path link;

determining a set of possible protection path widths from the set of possible protection paths;

selecting a maximum possible protection path width from the set of possible protection path widths;

if the number of possible protection paths is greater than one and the possible protection path maximum width is greater than zero then randomly selecting a protection path;

if the number of possible protection paths is greater than one and the protection path maximum width is equal to zero then performing the following:

determining the number of protection path links of zero width included in each possible protection path; and selecting the possible protection path with the fewest number of protection path links of zero width; and if the number of possible protection paths is equal to one then selecting the one possible protection path.

* * * * *

UNITED STATES PATENT AND TRADEMARK OFFICE
CERTIFICATE OF CORRECTION

PATENT NO. : 6,850,705 B2
DATED : February 1, 2005
INVENTOR(S) : Su et al.

It is certified that error appears in the above-identified patent and that said Letters Patent is hereby corrected as shown below:

Column 10,
Line 16, before "a set of", insert -- by --.
Line 20, delete "ink", insert -- link --.
Lines 33 and 44, delete "with", insert -- width --.

Column 11,
Lines 6 and 12, delete "ink", insert -- link --.
Line 19, delete "with", insert -- width --.
Line 22, delete "or", insert -- for --.
Line 52, delete "no e", insert -- node --.

Column 12,
Line 13, delete "or" insert -- for --.

Column 13,
Line 51, delete "ink", insert -- link --.
Line 58, delete "with", insert -- width --.

Column 14,
Line 1, delete "or", insert -- for --.

Column 16,
Line 16, after "establishing", insert -- a --.
Line 34, delete "path is", insert -- paths --.

UNITED STATES PATENT AND TRADEMARK OFFICE
CERTIFICATE OF CORRECTION

PATENT NO.   : 6,850,705 B2
DATED        : February 1, 2005
INVENTOR(S)  : Su et al.

It is certified that error appears in the above-identified patent and that said Letters Patent is hereby corrected as shown below:

Column 17,
Line 11, delete "difference", insert -- differences --.

Signed and Sealed this

Twenty-second Day of November, 2005

JON W. DUDAS
*Director of the United States Patent and Trademark Office*